(12) United States Patent
Maenpaa

(10) Patent No.: US 9,124,303 B2
(45) Date of Patent: *Sep. 1, 2015

(54) APPARATUS AND METHOD FOR NEAR FIELD COMMUNICATION

(75) Inventor: Ossi Ensio Maenpaa, Salo (FI)

(73) Assignee: Nokia Technologies Oy, Espoo (FI)

( * ) Notice: Subject to any disclaimer, the term of this patent is extended or adjusted under 35 U.S.C. 154(b) by 695 days.

This patent is subject to a terminal disclaimer.

(21) Appl. No.: 13/276,538

(22) Filed: Oct. 19, 2011

(65) Prior Publication Data

US 2013/0101149 A1    Apr. 25, 2013

(51) Int. Cl.
*H04B 5/00* (2006.01)
*H04R 25/00* (2006.01)
*H01Q 1/36* (2006.01)

(52) U.S. Cl.
CPC ............ *H04B 5/0006* (2013.01); *H04B 5/0037* (2013.01); *H04B 5/0068* (2013.01); *H04B 5/0075* (2013.01); *H04R 25/554* (2013.01); *H04R 2225/51* (2013.01)

(58) Field of Classification Search
USPC .......................................... 343/702, 742, 895
See application file for complete search history.

(56) References Cited

U.S. PATENT DOCUMENTS

| | | | |
|---|---|---|---|
| 6,031,923 A * | 2/2000 | Gnecco et al. ................ 381/322 |
| 6,951,305 B2 | 10/2005 | Overhultz et al. ............ 235/487 |
| 7,274,292 B2 | 9/2007 | Velhal et al. ............. 340/539.32 |
| 7,418,106 B2 | 8/2008 | Greuet et al. ................. 381/331 |
| 8,515,345 B2 * | 8/2013 | Takayama ..................... 455/41.1 |
| 2003/0152243 A1 | 8/2003 | Julstrom et al. .............. 381/315 |
| 2006/0097951 A1 * | 5/2006 | Noguchi ........................ 343/895 |
| 2006/0133633 A1 | 6/2006 | Hyvonen ....................... 381/315 |
| 2006/0267138 A1 * | 11/2006 | Kobayashi ..................... 257/531 |
| 2008/0014989 A1 * | 1/2008 | Sandegard et al. ........... 455/557 |
| 2009/0111378 A1 * | 4/2009 | Sheynman et al. .......... 455/41.1 |
| 2009/0117944 A1 * | 5/2009 | Lee et al. ....................... 455/566 |
| 2009/0221240 A1 * | 9/2009 | Zhang .............................. 455/68 |
| 2010/0021176 A1 * | 1/2010 | Holcombe et al. ............ 398/115 |
| 2012/0025939 A1 * | 2/2012 | Yamaguchi et al. .......... 336/105 |
| 2013/0052947 A1 * | 2/2013 | Kole et al. .................... 455/41.1 |

FOREIGN PATENT DOCUMENTS

| | | |
|---|---|---|
| EP | 1903755 A2 | 3/2008 |
| EP | 2129088 A1 | 12/2009 |
| WO | WO-2010108492 A | 9/2010 |
| WO | WO-2011/095841 A2 | 8/2011 |

* cited by examiner

*Primary Examiner* — Andrew Wendell
*Assistant Examiner* — Cindy Trandai
(74) *Attorney, Agent, or Firm* — Harrington & Smith

(57) ABSTRACT

An apparatus including a near field communication (NFC) system and a hearing aid compatibility (HAC) system. The near field communication system includes a near field communication antenna. The hearing aid compatibility system is configured to generate a magnetic field to be received by a hearing aid. The hearing aid compatibility system includes the near field communication antenna. Thus, both the near field communication system and the hearing aid compatibility system include the near field communication antenna as at least a portion of a common communication component for both of the systems.

28 Claims, 6 Drawing Sheets

APPARATUS AND METHOD FOR NEAR FIELD COMMUNICATION

BACKGROUND

1. Technical Field

The exemplary and non-limiting embodiments relate generally to an apparatus having a hearing aid compatibility system and a near field communication system and, more particularly, to a common communication component used in the apparatus.

2. Brief Description of Prior Developments

Hand-held communications devices are being designed slimmer and more compact with various components and modules, and with larger displays. These design arrangements leave less room for earpiece integration. Therefore, smaller earpiece components are used. However, such smaller earpiece components can only produce limited magnetic field which is not well suited for hearing aid compatible (HAC) requirements.

SUMMARY

The following summary is merely intended to be exemplary. The summary is not intended to limit the scope of the claims.

In accordance with one aspect, an apparatus is provided including a near field communication (NFC) system and a hearing aid compatibility (HAC) system. The near field communication system includes a near field communication antenna. The hearing aid compatibility system is configured to generate a magnetic field to be received by a hearing aid. The hearing aid compatibility system includes the near field communication antenna. Thus, both the near field communication system and the hearing aid compatibility system include the near field communication antenna as at least a portion of a common communication component for both of the systems.

In accordance with another aspect, a method comprises providing an apparatus comprising a near field communication (NFC) system including a near field communication antenna; and providing the apparatus with a hearing aid compatibility (HAC) system, where the hearing aid compatibility (HAC) system comprises the near field communication antenna such that the hearing aid compatibility (HAC) system is configured to use the near field communication antenna to generate a magnetic field.

In accordance with another aspect, a method comprises using a near field communication (NFC) system of an apparatus to communicate with another device, where the near field communication (NFC) system comprises a near field communication antenna; and using the near field communication antenna as part of a hearing aid compatibility (HAC) system to generate a magnetic field.

In accordance with another aspect, a non-transitory program storage device readable by a machine, tangibly embodying a program of instructions executable by the machine, is provided comprising the operations of communicating by an apparatus with a device by use of a near field communication (NFC) system of the apparatus; and communicating with a hearing aid by the apparatus with use of a hearing aid compatibility (HAC) system of the apparatus, where the hearing aid compatibility system comprises use of the near field communication antenna to generate a magnetic field to be received by the hearing aid.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
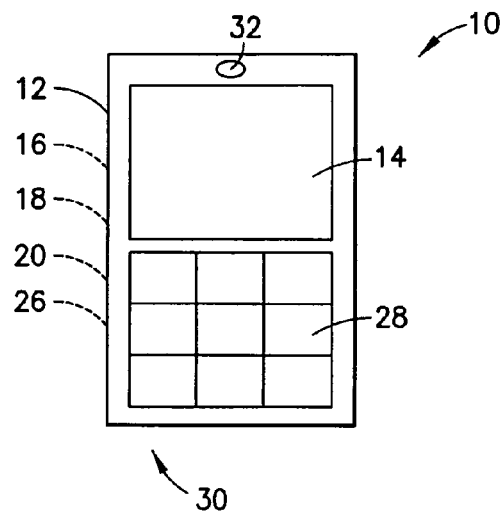
FIG. 1 is a front view of an example embodiment.

Referring to FIG. 1, there is shown a perspective view of an apparatus 10 incorporating features of an example embodiment. Although the features will be described with reference to the example embodiments shown in the drawings, it should be understood that features can be embodied in many alternate forms of embodiments. In addition, any suitable size, shape or type of elements or materials could be used.

Figure 8:
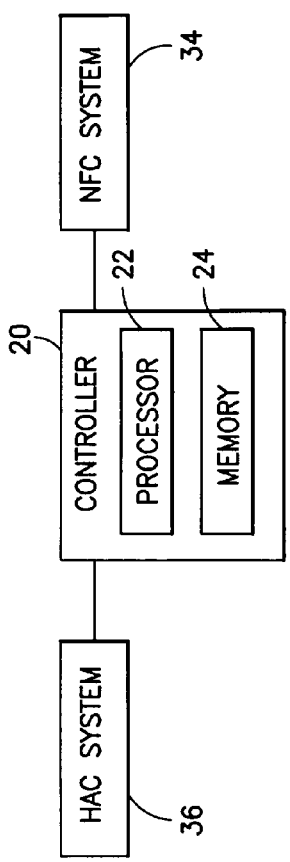
FIG. 8 is a diagram illustrating components of the apparatus shown in FIG. 1.

The apparatus 10 is a hand-held communications device which includes a telephone application. The apparatus 10 can also comprise an Internet browser application, camera application, video recorder application, music player and recorder application, email application, navigation application, gaming application, and/or any other suitable electronic device application. The apparatus 10, in this example embodiment, comprises a housing 12, a display 14, a receiver 16, a transmitter 18, a rechargeable battery 26, and a controller 20 which can include (referring also to FIG. 8) at least one processor 22, at least one memory 24, and software. However, all of these features are not necessary to implement the features described below.

The display 14 in this example is a touch screen display which functions as both a display screen and as a user input. However, features described herein could be used in a display which does not have a touch, user input feature. The user interface also includes a keypad 28. However, the keypad might not be provided if a touch screen is used. The electronic circuitry inside the housing 12 comprises a printed wiring board (PWB) having components such as the controller 20 thereon. The circuitry includes a sound transducer 30 provided as a microphone and a sound transducer 32 provided as a speaker or earpiece. The housing 12 has sound holes for sound to travel to and from the sound transducers through the housing 12.

Figure 2:
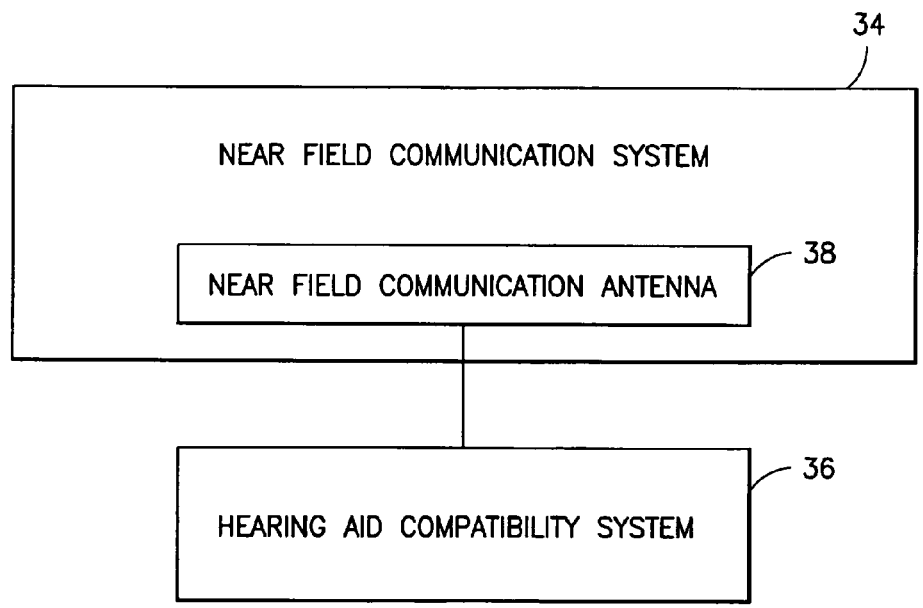
FIG. 2 is a block diagram illustrating components of the apparatus shown in FIG. 1.

Referring also to FIG. 2, the apparatus 10 comprises a Near Field Communication (NFC) system 34 and a Hearing Aid Compatibility (HAC) system 36.

Near field communication, or NFC, allows for simplified transactions, data exchange, and wireless connections between two devices in close proximity to each other, usually by no more than a few centimeters. Many smartphones currently on the market already contain embedded NFC chips that can send encrypted data a short distance ("near field") to a reader located, for instance, next to a retail cash register. Shoppers who have their credit card information stored in their NFC smartphones can pay for purchases by waving their smartphones near or tapping them on the reader, rather than bothering with the actual credit card.

The Near Field Communication Forum (NFC Forum) formed in 2004 promotes sharing, pairing, and transactions between NFC devices and develops and certifies device compliance with NFC standards. A smartphone or tablet With an NFC chip could make a credit card payment or serve as keycard or ID card. NFC devices can read NFC tags on a museum or retail display to get more information or an audio or video presentation. NFC can share a contact, photo, song, application, or video or pair Bluetooth devices.

NFC is a set of short-range wireless technologies, typically requiring a distance of 4 cm or less. NFC operates at 13.56 MHz on ISO/IEC 18000-3 air interface and at rates ranging from 106 kbit/s to 424 kbit/s. NFC always involves an initiator and a target; the initiator actively generates an RF field that can power a passive target. This enables NFC targets to take very simple form factors such as tags, stickers, key fobs, or cards that do not require batteries. NFC peer-to-peer communication is of course possible, where both devices are powered.

NFC tags contain data and are typically read-only, but may be rewriteable. They can be custom-encoded by their manufacturers or use the specifications provided by the NFC Forum, an industry association charged with promoting the technology and setting key standards. The tags can securely store personal data such as debit and credit card information, loyalty program data, PINs and networking contacts, among other information. The NFC Forum defines four types of tags which provide different communication speeds and capabilities in terms of configurability, memory, security, data retention and write endurance. Tags currently offer between 96 and 512 bytes of memory.

As with proximity card technology, near-field communication uses magnetic induction between two loop antennas located within each other's near field, effectively forming an air-core transformer. It operates within the globally available and unlicensed radio frequency ISM band of 13.56 MHz. Most of the RF energy is concentrated in the allowed 14 kHz bandwidth range, but the full spectral envelope may be as wide as 1.8 MHz when using ASK modulation. Theoretical working distance of a near field communication system with a compact standard antennas is up to 20 cm, but with a practical working distance of about 4 centimeters.

There are two modes:

Passive communication mode: The initiator device provides a carrier fields and the target device answers by modulating the existing field. In this mode, the target device may draw its operating power from the initiator-provided electromagnetic field, thus making the target device a transponder.

Active communication mode: Both initiator and target device communicate by alternately generating their own fields. A device deactivates its RF field while it is waiting for data. In this mode, both devices typically have power supplies.

NFC employs two different codings to transfer data. If an active device transfers data at 106 kbit/s, a modified Miller coding with 100 percent modulation can be used. In all other cases Manchester coding can be used with a modulation ratio of 10 percent. NFC devices are able to receive and transmit data at the same time. Thus, they can check for potential collisions if the received signal frequency does not match with the transmitted signal's frequency.

Figure 4:
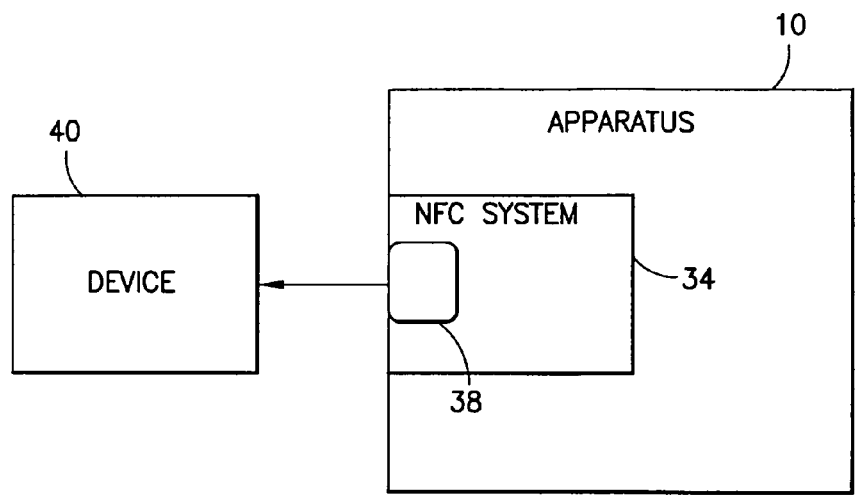
FIG. 4 is a diagram illustrating connection between the apparatus and a device with use of a near field communication.

In the example shown in FIG. 2, the NFC antenna 38 is provided proximate the rear side of the housing 12 at the top of the apparatus 10. The NFC antenna can be located in the rear side of a top part of the phone to allow easy touching of an NFC tag on another device 40 (see FIG. 4) when the phone is in hand in normal usage position (rear of phone in the user's palm, and the display 14 facing towards the user). The earpiece loudspeaker 32 can be located in a top part of the phone to maximize distance between the earpiece 32 and microphone 30 (to minimize acoustic echo).

Figure 3:
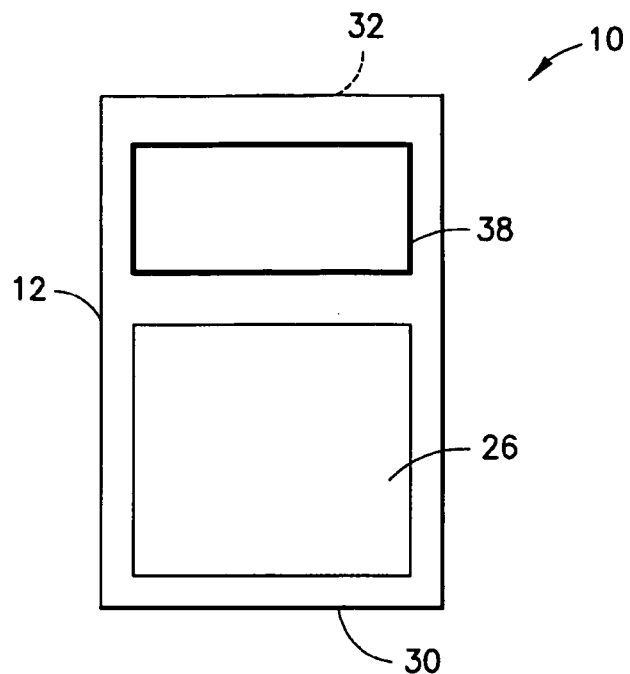
FIG. 3 shows a rear side of the apparatus shown in FIG. 1.

As can be seen in FIG. 3, the NFC antenna 38 is a relatively large loop or coil antenna. In this example the NFC antenna is flat, with an area of about 20 mm×30 mm. However, any suitable size could be provided. The antenna 38 could be provided on a flex circuit or printed wiring board for example. In another example, the antenna 38 could be formed on the rear housing piece of the housing 12.

A Hearing Aid Compatibility (HAC) system is a system to interconnect a phone magnetically into a hearing aid device. In the past, a telecoil or T-coil of the HAC system was mounted inside both the hearing aid and the audio device such as the telephone handset. It allowed the signals to be coupled from the phone to the hearing aid without a wired electrical connection and it avoids the problems that microphones would have with the amplification of background noise.

A telecoil is an induction coil. An induction coil is simply a metal rod that is encircled by many turns of a copper wire. Placed in an alternating magnetic field, an alternating electrical current is "induced" in the copper wire. (Reciprocally, an electrical current in a wire creates a tiny magnetic field around it.) What happens is that the coil converts (changes) magnetic energy to electrical energy, in much the same way that a microphone converts sounds waves to electrical energy. Generally, the strength of the inductive pick-up is determined by the number of turns of the copper wire around the metal axis rod. Larger rods permit more turns and more powerful telephone coils. Newer "T" coils include an integrated amplifier, which makes it feasible to reduce the physical size of the "T" coil.

When a hearing aid is switched to the "T" position, the telecoil is set to detect only an electromagnetic field. The strength of the electrical current "induced" in the telecoil by the electromagnetic field is directly proportional to both the energy in the magnetic field and to the relative positions of the induction coil in the hearing aid to the magnetic field (in a telephone or wire loop). This latter consideration is particularly important; in some positions, little or no electrical current will be created in the induction coil. The magnetic field will simply "pass through" the coil without producing much, if any, electrical current. This is the reason why experienced hearing aid users always experiment with the positioning with unfamiliar telephones: to find the "hot spot" where the strongest signal is heard.

Figure 5:
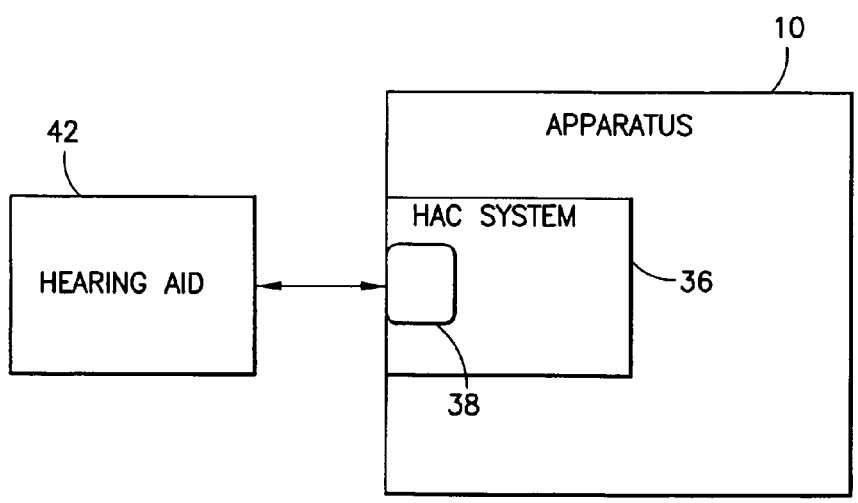
FIG. 5 is a diagram illustrating connection between the apparatus and a hearing aid with use of hearing aid compatibility.

The Hearing Aid Compatibility (HAC) system 36 does not have a telecoil. Instead, as shown in FIG. 2, the HAC system 36 is connected to the NFC antenna 38. The HAC system 36 uses the NFC antenna 38 as the coil for the HAC system 36. Thus, the NFC antenna 38 is used for two purposes or functions: 1. as the NFC coil for the NFC system 34 and 2. as the HAC coil for the HAC system 36. As seen in FIG. 5, the user can hold the phone 10 us to his/her ear at the hearing aid 42 to allow magnetic signals from the NFC coil 38 to be received by the telecoil in the hearing aid 42.

Mobile phones and in particular audio transducers (i.e. moving coil) generate certain levels of magnetic field. The field strength is due to several factors some of which are related to transducer design, other electronic components in close proximity, transducer integrations etc. The field strength is also utilized for HAC wherein handsets are designed to meet some required ratings (i.e. known as 'M' and 'T' ratings when the handsets are used with hearing aid devices). The conventional solutions for meeting these requirement is to employ a larger earpiece component and/or additional coils connected either in series or parallel with the earpiece component. However, it is known that these known solutions are complex integrations, require more space and increases component cost.

An example embodiment comprising features described herein can utilize a NFC antenna (wherein the NFC antenna is already used for NFC) for the purpose of speech call suitable for hearing aid users. Advantages of such an example embodiment include reduced cost of manufacture and a product design suitable for HAC requirement without adding further component and complexity.

An example embodiment relates to utilization of an "NFC" system which gives a specification for coil size and placement in a product; RF frequencies, amplitudes etc. Such coil 38 in the example embodiment is assumed to be a large (but thin); open air-filled coil printed on a flex or PWB, and optimized for NFC usage. This kind of coil has compromised efficiency in HAC usage, but provides a larger usage area which is easier to place against the ear for HAC use. The coil does not need a magnetic core, so it can be a smaller size (such as a discrete component soldered into a PWB). In other words, even though the coil is used for HAC, it does not need to be a telecoil. A telecoil has a better efficiency in HAC, but does not meet NFC specifications. A telecoil also has a very small "hot-spot" in HAC usage; meaning that the user has to move phone to find feasible audio signal. Use of the NFC coil as the coil for the HAC system provides a much larger hot-spot because of the much larger size of the NFC coil versus a conventional telecoil.

Figure 3A:
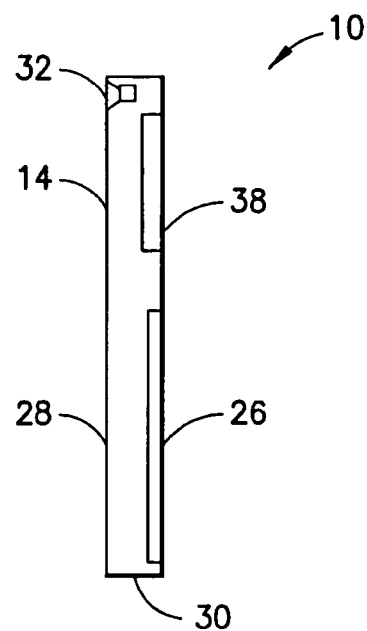
FIG. 3A is a side view of the apparatus shown in FIG. 1.

The drawings show how a NFC antenna and earpiece could be located to make Hearing Aid Compatibility by driving an audio signal to a NFC antenna. FIGS. 1, 3 and 3A illustrate a mono-block phone with a traditional keypad, but the same design criteria can be used also for other product concepts (such as touch displays, folded phones, etc.).

According to Hearing Aid Compatibility standards, the HAC signal is measured nearby the acoustical earpiece to allow the hearing aid users to keep the phone in a normal hand-portable usage position. When the earpiece is located upon the NFC antenna, the magnetic field created with the antenna coil is strong enough to fulfill HAC compliance requirements. The NFC antenna, in this example, is not located in the top of the battery cover because the battery current (especially with GSM) can create a lot of disturbances into the audio frequency area.

Originally HAC was meant to work with a magnetic field generated by a phone earpiece, but as sizes of earpieces are becoming very small, HAC performance is being reduced. An example embodiment can comprise increased HAC performance without an additional (big and expensive) transmitter coil. The NFC coil is working in a range of greater than 10 Mhz area, but the same component can be used for HAC compliancy (a mandatory feature in the U.S. markets). NFC applications are normally not used when the phone is used for speech calls. In a call-mode, the phone can be HAC compliant by driving the NFC antenna with the audio signal.

The big-size NFC coil antenna 38 can give a good HAC performance. NFC antenna and HAC transmitter can be in the top-part of the phone to obtain a good user experience. These two functionalities can use at least some of the same components to get smaller products and save component cost. The NFC antenna 38 is flat, with an area of about 20 mm×30 mm. An additional HAC coil on the other hand is about 8×2×2 mm which can be eliminated to thereby reduce component costs. The audio amplifier signal (such as a IHF amplifier output) can be routed to the NFC antenna. A small-value resistor might be added if the audio comes from a normal audio amplifier. In one example the NFC antenna 38 used has a 2 ohm impedance in the audio area and the audio amplifiers have greater than a 4 ohm load.

With implementation of at least some of the features described above, a smaller product size and cost can be provided compared to phones with an additional HAC coil. Better HAC performance can be provided than in phones where the HAC signal is generated with an earpiece magnetic field. If a higher magnetic field is needed to reach a better signal-to-noise ratio, the NFC antenna can also be driven with levels without compression. With an earpiece telecoil this is not possible because power handling capacity is more limited. The Near Field Communication (NFC) technology can be used to make a phone communicate with a passive (non-battery) ID tag.

Figure 6:
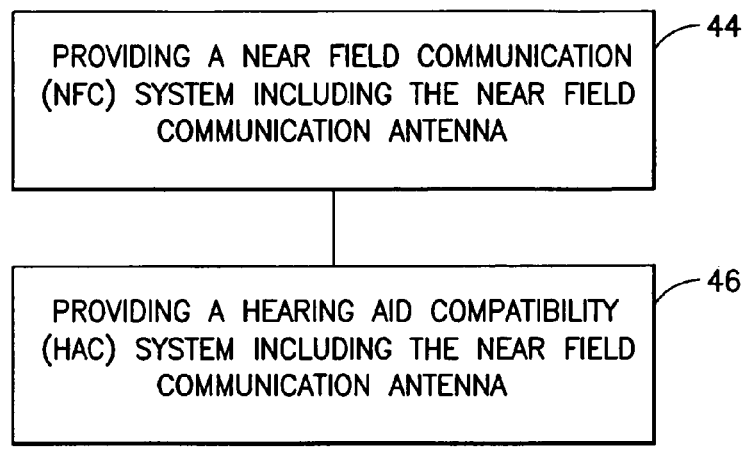
FIG. 6 is a diagram illustrating steps of an example method.

Referring also to FIG. 6, a method of manufacture can comprise providing an apparatus as indicated by block 44 comprising a near field communication (NFC) system including a near field communication antenna, where the near field communication system is configured to communicate with another device at a range of only about 4 centimeters or less using the near field communication antenna; and providing the apparatus as indicated by block 46 with a hearing aid compatibility (HAC) system, where the hearing aid compatibility (HAC) system comprises the near field communication antenna such that the hearing aid compatibility (HAC) system is configured to use the near field communication antenna to generate a magnetic field.

The hearing aid compatibility system may comprise the near field communication antenna as a sole coil for the hearing aid compatibility system. The near field communication antenna may be provided as a loop antenna. The method may further comprise providing the loop antenna as configured to form an air-core transformer with a loop antenna of the device for the near field communication system. The method may further comprise locating the antenna proximate a rear side of the apparatus, and the apparatus comprising a sound transducer proximate a sound hole through a front side of a housing of the apparatus.

Figure 7:
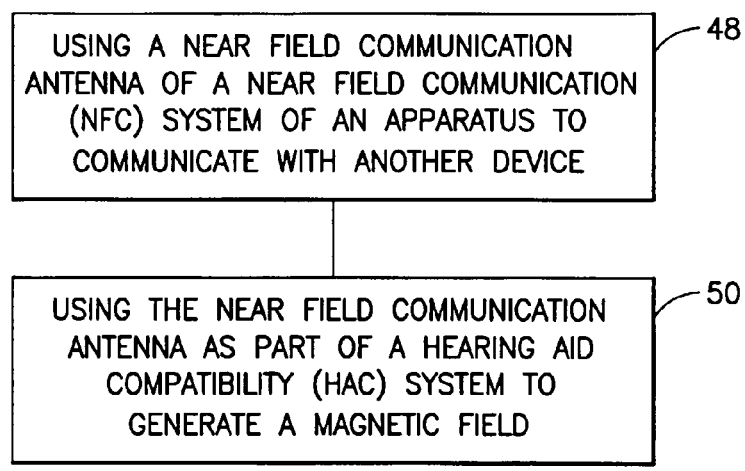
FIG. 7 is a diagram illustrating steps of another example method.

Referring also to FIG. 7, a method of use can comprise using a near field communication (NFC) system of an apparatus as indicated by block 48 to communicate with another device 40, where the near field communication (NFC) system comprises a near field communication antenna 38, and where the near field communication system is configured to communicate with the device at a range of only about 4 centimeters or less using the near field communication antenna; and using the near field communication antenna 38 as indicated by block 50 as part of a hearing aid compatibility (HAC) system to generate a magnetic field.

Figure 9:
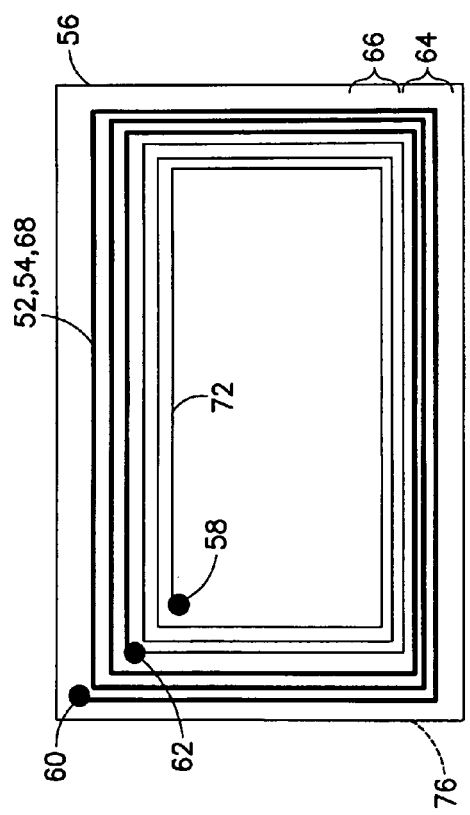
FIG. 9 is a rear side view of another example embodiment of a coil.
Figure 10:
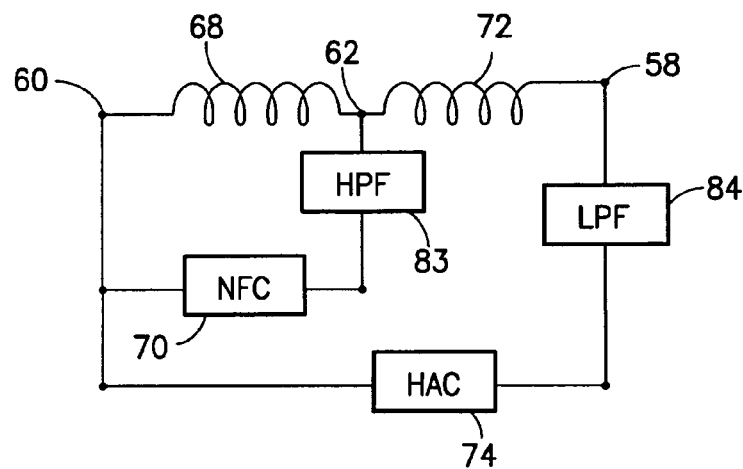
FIG. 10 is a circuit diagram illustrating connection to the coil shown in FIG. 9.

Referring also to FIGS. 9-10, an alternate embodiment is shown. The coil 52 in this example is an electrically conductive trace 54 on a flex circuit 56. The trace 54 is a single flat trace with multiple loops or rounds. An inner end 58 of the trace 54 forms a first connection point. An outer end 60 of the trace 54 forms a second connection point. A middle point 62 of the trace 54 forms a third connection point. This example illustrates that a "tapped coil" may be used to overcome some challenges in real product implementation. The three connection points at 58, 60 and 62 form three tap points at different length locations on the coil 52 for the rest of the NFC and HAC systems to connect. A conventional NFC coil has a relative low impedance (about ohms for example) which might be too low for normal audio amplifiers. This example embodiment illustrates that some additional rounds or loops of the coil, between tap points 58 and 62, may be provided in the coil 52 for HAC optimization.

In the example shown in FIG. 9, the coil has inner rounds 66 and outer rounds 64. The outer rounds 64 form an outer coil part 68 as illustrated in FIG. 10. The outer coil part 68 is located between the middle point (third connection point) 62 and the outer end (second connection point) 60. These two points 62, 60 are connected to the other component 70 of the NFC system. The inner rounds 66 form an inner coil part 72. The inner coil part 72 is located between the middle point (third connection point) 62 and the inner end (first connection point) 58. The other component 74 of the HAC system is connected to the two points 58, 60. Thus, the HAC system can use the entire length of the coil 52, but the NFC system only needs to use a portion of the length of the coil 52. In this example the width of the trace 54 at the inner coil part 72 (the inner rounds 66) is smaller than the width of the trace 54 at the outer coil part 68 (the outer rounds 64); transitioning at the middle point 62.

This example illustrates that in an NFC mode of using the coil 52 a lesser number of rounds of the coil might be used (such as 3-4 rounds for example), and in a HAC mode of using the coil 52 more than the 3-4 rounds of the coil could be used to have a higher impedance for audio amp (such as a target 8 ohm for example). These additional rounds can be made thinner (such as a narrower line in a PWB for example) to save space and have a higher resistance. This example illustrates that the coil structure can comprise a tapped combined NFC and HAC coil with an intermediate connection point for the NFC connection, two different PWB line coil widths with a big width outer part (low resistance) for the NFC and a narrow width inner part for the HAC to get a higher impedance in an audio frequency area.

FIG. 10 shows the parts 68, 72 as two coils, but this is merely for the sake of understanding. An example could have more than one coil, but the example shown in FIG. 9 is one coil with multiple loops or rounds and an intermediate feeding point. Schematic FIG. 10 also merely helps to understand that the thinner and thicker parts of the single line/trace which can be used in the different parts 68, 72. The circuitry can include filters 83 and 84. Filter 83 can be a high-pass filter such as less than 13.56 MHz for example. The filter 84 can be a low-pass filter such as greater than 20 kHz for example. In real application there might also be some additional EMC and tuning filtering components, but the two filters 83, 84 help to illustrate how separation may be accomplished between different usage modes. This example helps to illustrate, because of the filters 83, 84, how in a NFC mode the coil part 68 can be used and in a HAC mode both coil parts 68, 72 can be used. The figure clarifies the situation how these loops/rounds are configured can depend on the usage modes. For example, as noted above the HAC mode can use additional rounds/loops to have higher impedance for targeting the audio amplifier (such as a target 8 Ohm for example) where the additional (i.e. inner) rounds/loops can use thinner/narrower wire/line to save space and have a higher impedance. The filters 83, 84 may be used to distinguish between modes of use of the coil(s) and/or the controller may be used to distinguish between modes of use of the coil(s). FIG. 10 helps to explain how different parts of a single coil can be used with the different systems (NFC/HAC). FIG. 10 also helps to illustrate that perhaps more than one coil could be used (not necessarily a single coil as shown in FIG. 9). So long as the HAC system uses the NFC coil part 64/68, the additional coil part of the HAC coil could be anything (any suitable size or shape). The example embodiments shown in the drawings are not the only possibility of the shape of the coil(s). The inner coil part can have a different size and shape than the outer coil part, or the coils or coil parts could be at least partially stacked top of each other in other types of example embodiment. However, the coils/coil parts are located somehow symmetrically to get out good magnetic flux for the HAC operation when the coils/coil parts are connected in series. Thus, the NFC coil part 64/68 can be used as both the coil of the NFC and at least part of the coil for the HAC; regardless of what additional coil part the HAC might use. Example embodiments might have only one coil or might have more than one coil.

Figure 11:
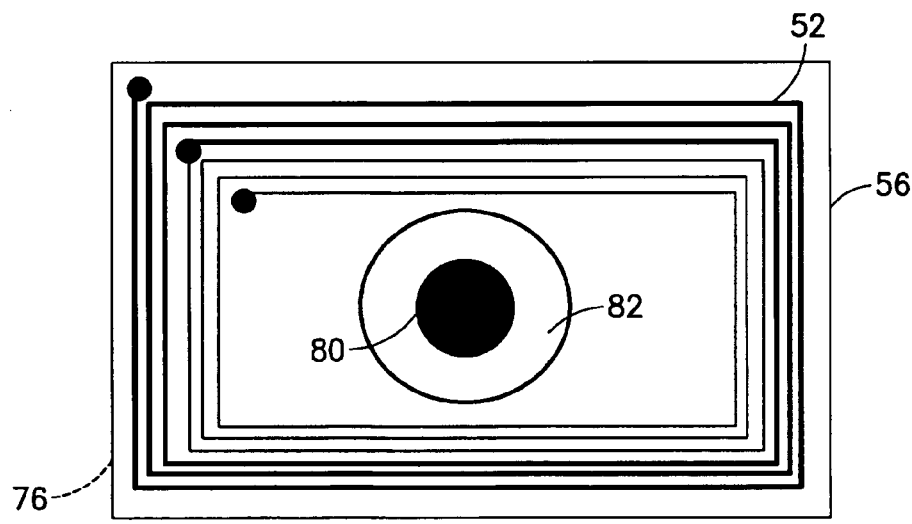
FIG. 11 is a rear side view of another example embodiment.

Referring also to FIG. 11, ferrite plating 76 can be placed at the backside of the flex 56 of the NFC coil part 68. The inner coil part 72 and the central part 78 of the flex 56 can be provided without the ferrite. The NFC performance might be compromised a little bit, but there can be much better HAC performance. The open central area in the coil 52 allows location of a component in an open central area 82 of the flex 56, such as a camera 80 (for example), to extend through the area in the middle of the coil 52. In one type of alternate embodiment, the ferrite could be provided without the camera. In another type of alternate embodiment hole through the flex for the camera could be provided without providing ferrite on the flex.

In one type of example an apparatus 10 is provided comprising a near field communication (NFC) system 34 and a hearing aid compatibility (HAC) system 36, where the near field communication system is configured to communicate with another device 40 at a range of only about 4 centimeters or less, where the near field communication system comprises a near field communication antenna 38; and where the hearing aid compatibility system is configured to generate a magnetic field to be received by a hearing aid 42, where the hearing aid compatibility system comprises the near field communication antenna 38, where both the near field communication system and the hearing aid compatibility system comprise the near field communication antenna 38 as at least a portion of a common communication (coil) for both of the systems.

The hearing aid compatibility system may comprise the near field communication antenna as a sole coil for the hearing aid compatibility system. The near field communication antenna may be a loop antenna. The loop antenna may be configured to form an air-core transformer with a loop antenna of the device 40 for the near field communication system. The near field communication antenna may be located proximate a rear side of the apparatus and the apparatus may comprise a sound transducer 32 proximate a sound hole through a front side of a housing of the apparatus. The near field communication system may be configured to operate in at least two communication modes with the near field communication antenna, where the at least two communication modes comprise a passive communication mode where the apparatus and the device form an initiator device and a target device, where the initiator device provides a carrier field and the target device answers by modulating the existing field, where the target device draws at least some of its operating power from an initiator-provided electromagnetic field, thus making the target device a transponder, and an active communication mode where both the initiator device and the target device communicate by alternately generating their own fields. The near field communication system may be configured to use two different codings to transfer data with the near field communication antenna. The near field communication system may be configured to receive and transmit data at a same time with the near field communication antenna. The apparatus may further comprise a controller 20 configured to control use of the near field communication antenna alternatively by the near field communication system and the hearing aid compatibility system based, at least partially, upon whether the apparatus is being used as a telephone during a telephone call. The apparatus may further comprise a wireless radio frequency communication system 16, 18 which does not use the near field communication antenna. The near field communication antenna may be a part of a longer coil 52. The coil may have a first section 68 with a first line width forming the near field communication antenna, and a second section 72 with a second narrower line width. The apparatus may further comprise ferrite along a side of the coil at a first coil section 68 of the coil, but the ferrite not being at a second coiled section 72 of the coil. The apparatus may further comprise a camera 80 extending through the coil.

One example embodiment may comprise an apparatus where the near field communication antenna forms an induction coil with at least two loops of conductive material, where the at least two loops of conductive material are at least one of:
 a single layer comprising at least two loops of conductive material; and
 at least two connected layers, each layer comprising at least one loop of conductive material,
 where the at least two loops or the at least two connected layers are configured, relative to usage of both systems, such that a total coil impedance increases when the at least two loops or the at least two connected layers are configured.

At least one of the at least two layers may be configured to have a higher resistance than another one of the at least two layers.

One example method may comprises providing an apparatus comprising a near field communication (NFC) system 34 including a near field communication antenna 38, where the near field communication system is configured to communicate with another device at a range of only about 4 centimeters or less using the near field communication antenna; and providing the apparatus with a hearing aid compatibility (HAC) system 36, where the hearing aid compatibility (HAC) system comprises the near field communication antenna 38 such that the hearing aid compatibility (HAC) system is configured to use the near field communication antenna to generate a magnetic field.

In one type of example a non-transitory program storage device, such as memory 24 or a CD-ROM or other storage memory, readable by a machine 10, tangibly embodying a program of instructions executable by the machine can be provided. The operations can comprise communicating by an apparatus with a device by use of a near field communication (NFC) system of the apparatus, where the near field communication (NFC) system comprises a near field communication antenna which communicates with the device at a range of only about 4 centimeters or less; and communicating with a hearing aid by the apparatus with use of a hearing aid compatibility (HAC) system of the apparatus, where the hearing aid compatibility system comprises use of the near field communication antenna to generate a magnetic field to be received by the hearing aid.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
 a near field communication (NFC) system, where the near field communication system comprises a near field communication antenna; and
 a hearing aid compatibility (HAC) system, where the hearing aid compatibility system is configured to generate a magnetic field to be received by a hearing aid, where the hearing aid compatibility system comprises the near field communication antenna,
 where both the near field communication system and the hearing aid compatibility system comprise the near field communication antenna as at least a portion of a common communication component for both of the systems,
 where the near field communication antenna forms at least part of an induction coil with either:
  a single layer comprising at least two loops of conductive material; or
  at least two connected layers, each layer comprising at least one loop of conductive material,
 where the at least two loops or the loops of the at least two connected layers are configured, relative to usage of both systems, such that a total coil impedance increases when the loops are used with the hearing aid compatibility (HAC) system versus use of less than all of the loops with the near field communication (NFC) system.

2. An apparatus as in claim 1 comprising means for generating magnetic fields from the near field communication antenna during a telephone call with the apparatus.

3. An apparatus as in claim 1 where the hearing aid compatibility system comprises the near field communication antenna as a sole coil for the hearing aid compatibility system.

4. An apparatus as in claim 1 where the near field communication antenna is a loop antenna.

5. An apparatus as in claim 4 where the loop antenna is configured to form an air-core transformer with a loop antenna of another device for the near field communication system.

6. An apparatus as in claim 1 where the near field communication antenna is located proximate a rear side of the apparatus and the apparatus comprises a sound transducer proximate a sound hole through a front side of a housing of the apparatus.

7. An apparatus as in claim 1 where the near field communication system is configured to operate in at least two communication modes with the near field communication antenna, where the at least two communication modes comprise:
 a passive communication mode where the apparatus and the device form an initiator device and a target device, where the initiator device provides a carrier field and the target device answers by modulating an existing field, where the target device draws at least some of its operating power from an initiator-provided electromagnetic field, thus making the target device a transponder, and an active communication mode where both the initiator device and the target device communicate by alternately generating their own fields.

8. An apparatus as in claim 1 where the near field communication system is configured to use two different codings to transfer data with the near field communication antenna.

9. An apparatus as in claim 1 where the near field communication system is configured to receive and transmit data at a same time with the near field communication antenna.

10. An apparatus as in claim 1 further comprising a controller configured to control use of the near field communication antenna alternatively by the near field communication system and the hearing aid compatibility system based, at least partially, upon whether the apparatus is being used as a telephone during a telephone call.

11. An apparatus as in claim 1 where the apparatus further comprises a short range, wireless radio frequency communication system which does not use the near field communication antenna.

12. An apparatus as in claim 1 where the induction coil is longer than the near field communication antenna.

13. An apparatus as in claim 12 where the induction coil has a first section with a first line width forming the near field communication antenna, and a second section with a second narrower line width.

14. An apparatus as in claim 12 further comprising ferrite along a side of the induction coil at a first coil section of the induction coil, but the ferrite not being at a second coil section of the induction coil.

15. An apparatus as in claim 12 further comprising a camera extending through the induction coil.

16. An apparatus as in claim 12 where the induction coil comprises at least three tap locations at different lengths on the induction coil.

17. An apparatus as in claim 1 where the near field communication system is configured to communicate with another device at a range of only about 4 centimeters or less.

18. A method comprising:
providing an apparatus comprising a near field communication (NFC) system including a near field communication antenna, where the near field communication antenna forms at least part of an induction coil with either:
a single layer comprising at least two loops of conductive material; or
at least two connected layers, each layer comprising at least one loop of conductive material; and
providing the apparatus with a hearing aid compatibility (HAC) system, where the hearing aid compatibility (HAC) system comprises the near field communication antenna such that the hearing aid compatibility (HAC) system is configured to use the near field communication antenna to generate a magnetic field,
where the at least two loops or the loops of the at least two connected layers are configured, relative to usage of both systems, such that a total coil impedance increases when the loops are used with the hearing aid compatibility (MAC) system versus use of less than all of the loops with the near field communication (NFC) system.

19. A method as in claim 18 where the hearing aid compatibility system comprises the induction coil as a sole coil for the hearing aid compatibility system.

20. A method as in claim 18 further comprising providing the near field communication antenna as a loop antenna.

21. A method as in claim 20 further comprising providing the loop antenna as configured to form an air-core transformer with a loop antenna of another device for the near field communication system.

22. A method as in claim 18 further comprising locating the antenna proximate a rear side of the apparatus, and the apparatus comprising a sound transducer proximate a sound hole through a front side of a housing of the apparatus.

23. A method as in claim 18 where the near field communication system is configured to communicate with another device at a range of only about 4 centimeters or less using the near field communication antenna.

24. A method comprising:
using a near field communication (NFC) system of an apparatus to communicate with another device, where the near field communication (NFC) system comprises a near field communication antenna; and
using the near field communication antenna as part of a hearing aid compatibility (HAC) system to generate a magnetic field,
where the near field communication antenna forms at least part of an induction coil with either:
a single layer comprising at least two loops of conductive material; or
at least, two connected layers, each layer comprising at least one loop of conductive material,
where the at least two loops or the loops of the at least two connected layers are configured, relative to usage of both systems; such that a total coil impedance increases when the loops are used with the hearing aid compatibility (HAC) system versus use of less than all of the loops with the near field communication (NFC) system.

25. A method as in claim 24 where the near field communication system is configured to communicate with the device at a range of only about 4 centimeters or less using the near field communication antenna.

26. A method as in claim 24 further comprising locating the apparatus proximate a hearing aid such that the near field communication antenna provides an enlarged hot spot with the hearing aid for the hearing aid compatibility system to be more readily positioned relative to the hearing aid for use in a hearing aid compatibility mode.

27. A non-transitory program storage device readable by a machine, tangibly embodying a program of instructions executable by the machine, the operations comprising:
communicating by an apparatus with a device by use of a near field communication (NFC) system of the apparatus; and
communicating with a hearing aid by the apparatus with use of a hearing aid compatibility (HAC) system of the apparatus, where the hearing aid compatibility system comprises use of a near field communication antenna to generate a magnetic field to be received by the hearing aid,
where the near field communication antenna forms at least part of an induction coil with either:
a single layer comprising at least two loops of conductive material; or
at least two connected layers, each layer comprising at least one loop of conductive material,
where the at least two loops or the loops of the at least two connected layers are configured, relative to usage of both systems, such that a total coil impedance increases when the loops are used with the hearing aid compatibility (RAC) system versus use of less than all of the loops with the near field communication (NFC) system.

28. An apparatus as in claim 1 where at least one of the loops is configured to provide a higher resistance than at least another one of the loops.

\* \* \* \* \*

UNITED STATES PATENT AND TRADEMARK OFFICE
CERTIFICATE OF CORRECTION

PATENT NO. : 9,124,303 B2  Page 1 of 1
APPLICATION NO. : 13/276538
DATED : September 1, 2015
INVENTOR(S) : Maenpaa It is certified that error appears in the above-identified patent and that said Letters Patent is hereby corrected as shown below:

In the claims

Claim 18, col. 11, line 61 "MAC" deleted and --HAC-- inserted.

Claim 27, col. 12, line 66 "RAC" deleted and --HAC-- inserted.

Signed and Sealed this
Eighth Day of December, 2015

Michelle K. Lee
*Director of the United States Patent and Trademark Office*